(12) United States Patent
Merzougui et al.

(10) Patent No.: US 7,220,501 B2
(45) Date of Patent: May 22, 2007

(54) INTEGRATED HYBRID ELECTROCHEMICAL DEVICE

(75) Inventors: Belabbes Merzougui, Warren, MI (US); Swathy Swathirajan, West Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 626 days.

(21) Appl. No.: 10/797,461

(22) Filed: Mar. 10, 2004

(65) Prior Publication Data

US 2005/0202290 A1    Sep. 15, 2005

(51) Int. Cl.
| | |
|---|---|
| H01M 10/46 | (2006.01) |
| H01M 8/24 | (2006.01) |
| H01M 8/02 | (2006.01) |
| H01M 8/04 | (2006.01) |

(52) U.S. Cl. .............................. 429/9; 429/12; 429/17; 429/122

(58) Field of Classification Search .................... 429/9, 429/12, 17, 122
See application file for complete search history.

(56) References Cited

U.S. PATENT DOCUMENTS

| | | | |
|---|---|---|---|
| 2001/0033959 A1 | 10/2001 | Ovshinsky et al. | 429/40 |
| 2003/0129459 A1* | 7/2003 | Ovshinsky et al. | 429/9 |
| 2003/0207156 A1* | 11/2003 | Ovshinsky et al. | 429/9 |
| 2004/0192124 A1* | 9/2004 | Krietzman | 440/6 |
| 2005/0202290 A1* | 9/2005 | Merzougui et al. | 429/9 |
| 2006/0238033 A1* | 10/2006 | Raiser et al. | 307/66 |

FOREIGN PATENT DOCUMENTS

| | | |
|---|---|---|
| EP | 0277332 | 12/1987 |
| WO | WO 01/69701 | 9/2001 |

OTHER PUBLICATIONS

"Electrochemical behavious of intermetallic-based metal hydrides use in Ni/metal hydride (MH) batteries: a review" F. Feng; M. Geng; D.O.Northwood; International journal of Hydrogen Energy:, 2001, pp. 725-734.

Zirgon®: A New Separator for Ni-H2 Batteries and Alkaline Fuel Cells Ph. Vermeiren; W. Adriansens; R. Leysen, Int. J. Hydrogen Energy, vol. 21. No. 8, pp. 679-684.

* cited by examiner

*Primary Examiner*—Mark Ruthkosky
(74) *Attorney, Agent, or Firm*—Charles H. Ellerbrock (57) ABSTRACT

An integrated hybrid electrochemical device comprising a nickel-metal hydride battery and an alkaline $H_2$—$O_2$/air fuel cell together sharing a common alkali metal electrolyte in a housing common to both. In one embodiment, the NiMH battery and alkaline fuel cell electrodes share only the same electrolyte. According to another embodiment, the battery and fuel cell electrodes not only share the same electrolyte, but also share common reactant supply plenums as well. In another embodiment, the battery and fuel cell electrodes share a common electrolyte, common reactant (i.e. $H_2$ and $O_2$ or air) supply plenums, and common current collectors.

11 Claims, 10 Drawing Sheets

INTEGRATED HYBRID ELECTROCHEMICAL DEVICE

TECHNICAL FIELD

This invention relates to electrochemical devices, and more particularly to internally integrated nickel metal hydride battery electrodes and alkaline $H_2$—$O_2$/air fuel cell gas-diffusion electrodes that share a common electrolyte, and can perform both voltaic and electrolytic functions.

BACKGROUND OF THE INVENTION

Nickel metal-hydride (NiMH) batteries, and methods for their manufacture, are well known. Such batteries produce electrical current by the electrochemical reaction between NiOOH and a metal hydride (MH) in an aqueous alkali metal hydroxide (e.g. KOH) electrolyte according to the following reactions:

Cathode (+): $NiOOH+H_2O+e \rightleftharpoons Ni(OH)_2+OH-$  (1)

Anode (−): $MH+OH- \rightleftharpoons M+H_2O+e$  (2)

Overall: $MH+NiOOH \rightleftharpoons M+Ni(OH)_2$  (3)

where "M" is a metal (i.e. alloyed or not) capable of electrochemically storing and releasing hydrogen in a KOH environment.

Suitable metal hydrides for these batteries are primarily formed from transition metals (i.e. the Group IIIA–VIIIA metals of the Periodic Table including the lanthanide series [i.e. rare earth] metals). Of these, (1) the $AB_2$-based phase where A=Zr, Ti, or Mg, and B=Ni, V, Cr or Mn, such as $ZrMn_2$, $ZrCr_2$, (2) the $AB_5$-based phase where A=rare earths such as La or mischmetal, and B=transition metals such as Ni, have been found to be particularly effective, and include, inter alia, such alloys as $LaNi_5$, $CaNi_5$, $ZrV_2$, and alloys thereof with such other metals as aluminum, tin, manganese, cobalt, silicon, chromium, calcium, magnesium, lithium, carbon, titanium vanadium, iron, yttrium, nickel, copper, zirconium, niobium, molybdenum lanthanum, tungsten and rhenium, and various rare earth metals. Moreover, $Ti_3Ni_2$ and Cr-doped or Al-doped $Ti_3Ni_2$ have shown to be effective hydride formers. The MH electrode may be prepared by mixing ball-milled MH powder with carbon powder and a binder (e.g. polyethylene), and hot pressing it onto a suitable support/current collector. Preferably, electrocatalytic metals (e.g. $AB_3$-type materials such as $MoCo_3$, $MoNi_3$, $WNi_3$, $ZrPt_3$, inter alia) will be homogeneously distributed throughout the MH-C mix to provide good hydrogen storage levels and electrocatalytic activity. Hot KOH etching of the electrodes enhances their activation. A more detailed discussion of MH electrodes can be found in F. Feng, M. Geng, D. Northwood, Electrochemical behavior of intermetallic-based metal hydrides used in Ni/metal hydride (MH) batteries: a review, International Journal of Hydrogen Energy 26, 725–734, (2001), which is incorporated herein by reference.

NiOOH electrodes are made by (1) first preparing a paste comprising $Ni(OH)_2$ and a binder [e.g. polytetrafluoroethylene (PTFE), polyethylene (PE), and/or polyvinyl chloride (PVC)] in a suitable solvent [e.g. a mixture of tetrahydrofuran (THF) and dimethylformamide (DMF), or a mixture of t-butanol and water], (2) spreading the paste onto a suitable support/current collector (e.g. Ni screen, mat, expanded metal or foam), and (3) heating it (e.g. 130° C.–250° C.) for about 5–10 minutes to drive off the solvent, and bind the paste's components together and to the support/current collector. Carbon particles may be added to the mix to enhance its conductivity. The $Ni(OH)_2$ converts to NiOOH when the battery is charged.

Low temperature, alkaline $H_2$—$O_2$/air fuel cells (hereafter AFC) are well known in the art and include cells that use either pure oxygen or air as the oxidant (hereafter $O_2$/air or oxygen/air). Such fuel cells produce electrical current by the electrochemical reaction between $H_2$ and $O_2$/air at temperatures preferably below about 80° C. in an aqueous KOH electrolyte according to the following reactions:

anode: $H_2+2OH- \rightarrow 2H_2O+2e-$  (4)

cathode: $O_2+2H_2O+4e- \rightarrow 4OH-$  (5)

overall: $2H_2+O_2 \rightarrow 2H_2O$  (6)

Electrodes for such AFCs are known as "gas-diffusion" electrodes, which (1) comprise a gas diffusion layer and a reaction layer, (2) are inert to the reactants and the electrolyte, and (3) are electronically conductive, and porous—having a pore system through which gas can be readily transferred, but which resists leakage of electrolyte into the gas chambers or flood the electrode. The use of small pores in the range of 1–100 microns provide strong capillary forces that resist free flow of electrolyte through the electrode. Dual porosity electrodes having larger pores on the gas side, and smaller pores on the electrolyte side, have proven to be quite effective. Gas-diffusion electrodes have been made from self-supporting porous carbon or sintered metal (e.g. nickel), or by securing a porous active material (e.g. carbon) to a porous current collector. Plastic-bonded electrodes (i.e. catalyst particles in a plastic matrix) have also been used successfully. A catalyst (e.g. Pt, Pt—Pd, Ni, Ag, NiO etc.) suitable to effecting the anode reaction or the cathode reaction, as appropriate, is contained within the porous active material. Wetproofed gas-diffusion electrodes have (1) a hydrophobic side that confronts the reactant gas (i.e. $H_2$ or $O_2$/air) and is not wettable by the electrolyte, and (2) an opposing, hydrophilic side that confronts the electrolyte and is wettable thereby. A catalyzed reaction zone exists within the electrode, between the two sides, where the three phases (i.e. liquid electrolyte, gaseous reactant, and solid current collector/catalyst) meet to form an anode or cathode reaction site, as appropriate. Oft times, the electrolyte-confronting side of the electrode is covered with an electrolyte-absorbent material, e.g. a material like that used as a separator in NiMH batteries. Since Wm. Grove's invention of the fuel cell, and F. T. Bacon's adaptation thereof to aqueous KOH electrolytes, the techniques and materials for manufacturing gas diffusion electrodes have advanced significantly, have become highly developed in the art, and are all useful in the practice of the present invention.

Early AFCs used noble metal catalysts (e.g. Pt) for both the anode and cathode. Non-noble, metal hydride anode catalysts have been proposed that both (1) catalyze the formation of atomic hydrogen and water, and (2) store hydrogen within the anode for release when needed. Such electrodes are known as $H_2$-storing electrodes and contain non-noble metal catalysts that comprise rare-earth/mischmetal alloys, zirconium and/or titanium or mixtures thereof, and include, for example, $M_aCo_bMn_cFe_dSn_e$ (where "M"=0.1–60 atomic % Ti, 0.1–40 atomic % Zr, 0–60 atomic % V, 0.1-atomic % Ni, and 0–56 atomic % Cr), "b"=0–7.5 atomic %, "c"=13–17 atomic %, "d"=0–3.5 atomic percent, "e"=0–1.5 atomic %, and a+b+c+d+e=100%. Catalytic regions will preferably be distributed throughout the anode material. Such catalysts are discussed in more detail in PCT Patent Application US01/07864 which was published as International Publication Number WO 01/69701 on 20 Sep. 2001, and is herein incorporated by reference. $H_2$-storing AFC anodes comprising Raney nickel and $H_2$-absorbing alloys have been proposed, and are discussed in EPO Patent 277332 (i.e. EP Patent Application no. EP 87118803 filed Dec. 18, 1987) which is also incorporated herein by reference.

Similarly, AFC cathodes capable of storing and releasing oxygen have been proposed. Such electrodes are known as O2-storing electrodes and comprise a mixture of a non-noble catalyst (e.g. carbon) and an active material capable of reversibly storing energy through a redox (reduction/oxidation) couple mechanism such as provided by metal/oxide couples selected from the group consisting of copper/copper oxide, silver/silver oxide, zinc/zinc oxide, cobalt/cobalt oxide, and cadmium/cadmium oxide, inter alia. The NiOH/NiOOH redox couple is also considered to be useful. AFC cathodes made from such redox couples are discussed in more detail in U.S. patent application Ser. No. 09/797,332 published Oct. 25, 2001 as U.S. 2001/0033959 A1, which is incorporated herein by reference. AFCs containing $H_2$-storing anodes and $O_2$-storing cathodes discussed above are said to also be capable of functioning as electrolyzers for electrolytically dissociating water into hydrogen and oxygen which is stored in the anode and cathode respectively (e.g. during regenerative braking of vehicles powered by such AFCs).

The electrolytes used for both the NiMH batteries and AFCs are essentially the same, and comprise about 20% to about 50% aqueous alkali metal hydroxide, preferably about 30% KOH for its superior conductivity. The electrolyte may either be flowed between the electrodes, or be maintained static therebetween, as in a quiescent pool, or by absorption into a porous matrix (e.g. asbestos cloth or mat, or a cast polymer film), a.k.a. "separator", that engages, and separates, adjacent electrodes one from the next. The electrolyte-absorbing matrix/separator may be made with finer pores than the adjacent electrodes which is effective in preventing flooding of the electrodes. A popular matrix/separator material is ZIRFON® which comprises a cast film (i.e. about 200 μm to about 350 μm thick) comprising zirconium oxide and polysulfone. ZIRFON® is discussed in Ph. Vermeiren, W. Adriansens and R. Leysen, ZIRFON® A new Separator for Ni—$H_2$ Batteries and Alkaline Fuel Cells, Int. J. Hydrogen Energy Vol. 21, No. 8, pp. 679–684, 1996, which is incorporated herein by reference. Circulating electrolytes are preferred for AFCs as a means to carry away the reaction water, to help manage the AFC's temperature, and to permit external purification of the electrolyte (i.e. remove carbonates formed therein by reaction with CO2 in the air) before it is recirculated back to the fuel cell.

SUMMARY OF THE INVENTION

The present invention contemplates an integrated NiMH battery and AFC combination configured so as to share a common electrolyte. According to one embodiment, NiMH and AFC electrodes share only the same electrolyte. According to another embodiment, NiMH battery electrodes and AFC electrodes not only share the same electrolyte, but also share common reactant supply plenums as well. In still another embodiment, the NiMH battery electrodes and AFC electrodes share a common electrolyte, common reactant (i.e. $H_2$ and $O_2$/air) supply plenums, and common current collectors.

More specifically, the present invention contemplates an integrated, hybrid electrochemical device comprising (1) a first set of electrodes which, in the charged state, comprises a NiOOH electrode and a dissociable metal-hydride electrode, and (2) a second set of electrodes comprising a hydrogen gas-diffusion electrode and an $O_2$/air gas-diffusion electrode, which sets share an alkali metal hydroxide (e.g. KOH) electrolyte common to all of the electrodes. The first set of electrodes will preferably be separated one from the other by an electrolyte-absorbent separator material that is wetted by the electrolyte, and that communicates with the electrolyte that is between the second set of electrodes. Preferably, the electrolyte will flow continuously between the second set of electrodes, and the separator material will also cover the faces of the gas-diffusion electrodes that are exposed to the flowing electrolyte to prevent erosion of such faces. An $O_2$/air plenum confronts the $O_2$/air gas-diffusion electrode for supplying $O_2$/air thereto, and a hydrogen plenum confronts the hydrogen gas-diffusion electrode for supplying hydrogen thereto. Preferably, the second set of electrodes will contain $H_2$-storing and $O_2$-storing electrocatalysts for the fuel cell reactions.

According to one embodiment of the invention, the $O_2$/air plenum also confronts the nickel hydroxide electrode and supplies $O_2$/air thereto, and the hydrogen plenum also confronts the metal-hydride electrode and supplies hydrogen thereto. According to another embodiment, a first current collector is provided that is common to both the AFC's $O_2$/air gas-diffusion electrode and the NiMH battery's NiOOH electrode for collectively conducting electrical current from the $O_2$/air gas-diffusion and the NiOOH electrodes upon discharge of the device, and a second current collector is provided that is common to both the AFC's hydrogen gas-diffusion and the NiMH battery's metal-hydride electrode for collectively conducting electrical current from the hydrogen gas-diffusion and metal-hydride electrodes upon discharge of the device. Preferably, the NiOOH and $O_2$/air gas-diffusion electrode materials will contact (preferably overlap) each other on the first current collector common to both, and the metal hydride and hydrogen gas-diffusion electrode materials will contact (preferably overlap) each other on the second current collector common to both. In still another embodiment, each electrode has its own current collector which is independent from the other current collectors.

The hybrid electrochemical device of the present invention can act as a battery, as a fuel cell, as an electrolyzer or combinations thereof, depending on the electric output from, or input to, the device. It has the ability to achieve a higher output voltage than the fuel cell alone at lower current densities and high battery electrode state of charge, and can provide in-situ local charging (chemically and electrochemically) of the battery electrodes. In this latter regard, local charging of the battery electrodes is seen to occur:

(1) by physical or chemical interaction, wherein hydrogen and $O_2$/air are applied directly to the battery electrodes which leads to physical adsorption of hydrogen to form hydride and chemical reaction of oxygen with the nickel hydroxide electrode and is simply expressed as follows (actually, they are more complex multi-step reactions involving intermediates):

$$M + \tfrac{1}{2}H_2 \rightarrow MH \tag{7}$$

$$2Ni^{II}(OH)_2 + \tfrac{1}{2}O_2 \rightarrow 2Ni^{III}(OOH) + H_2O \tag{8}$$

(2) by local electrochemical reactions, wherein, at voltages less than 1.0 volt, fuel cell reactions occur spontaneously in the presence of the Pt catalyst causing local cell charging of the battery electrodes. In this regard, charging of the hydride electrode occurs as follows:

$$H_2 + 2OH^- \rightarrow 2H_2O + 2e \quad \text{(Local anode reaction)} \quad (9)$$

$$M + H_2O + e \rightarrow MH + OH^- \quad \text{(Local cathode reaction)} \quad (10)$$

Charging of the nickel hydroxide electrode is seen to occur as follows:

$$O_2 + 4H_2O + 4e \rightarrow 4OH^- \quad \text{(Local cathode reaction)} \quad (11)$$

$$Ni^{II}(OH)_2 + OH^- \rightarrow Ni^{III}(OOH) + H_2O + e \quad \text{(Local anode reaction)} \quad (12)$$

Thus in the presence of the Pt catalyst in the fuel cell electrode, the cathodic reduction of oxygen and the anodic oxidation of hydrogen occurring at the fuel cell electrodes supplements the battery charging reactions.

DESCRIPTION OF CERTAIN EMBODIMENTS

Figure 1:
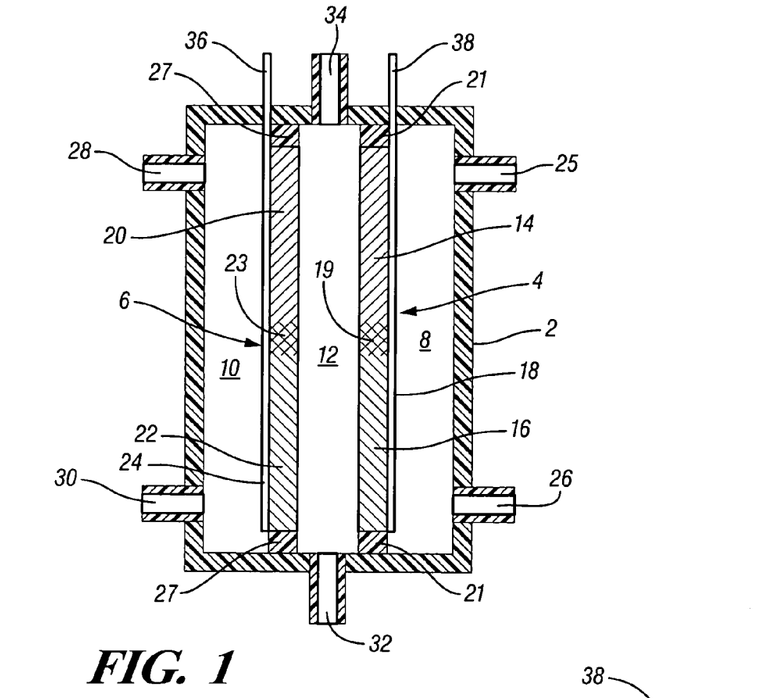
FIG. 1 is a schematic, side-view illustration of a first embodiment of a hybrid electrochemical device according to the present invention.
Figure 2:
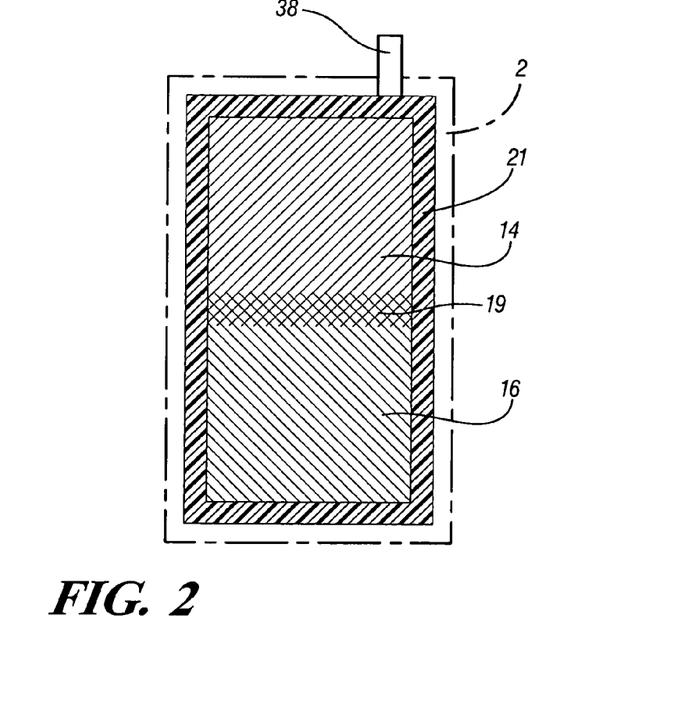
FIG. 2 is a view of a combination electrode of the present invention taken in the direction 2—2 of FIG. 1.

FIGS. 1 and 2 schematically depict one embodiment (hereinafter Type-I) of an integrated hybrid electrochemical device according to the present invention wherein the electrodes share current collectors, reactant gases and electrolyte. More specifically, the device comprises a housing 2 encasing a first combination electrode 4 and a second combination electrode 6, which combination electrodes divide the housing 2 into a hydrogen plenum 8 behind the first combination electrode 4, an $O_2$/air plenum 10 behind the second combination electrode 6, and an electrolyte compartment 12 between the first and second combination electrodes 4 and 6. The first combination electrode 4 comprises a MH battery electrode portion 14 and a hydrogen gas-diffusion fuel cell electrode portion 16, both bonded to a common current collector 18 and mounted in a nonconductive (e.g. plastic) frame 21. The battery portion 14 and the fuel cell portion 16 preferably contact (i.e slightly overlap) each other at 19. The second combination electrode 6 comprises a NiOOH battery electrode portion 20 and an oxygen/air gas-diffusion fuel cell electrode portion 22, both bonded to a common current collector 24 and mounted in a nonconductive frame 27. The battery portion 20 and the fuel cell portion 22 will preferably slightly overlap each other at 23. The hydrogen plenum 8 has a hydrogen inlet 25 and a hydrogen outlet 26 for admitting and exhausting hydrogen to/from the hydrogen plenum 8. Similarly, oxygen/air plenum 10 has an oxygen/air inlet 28, and an oxygen/air outlet 30 for admitting and exhausting air to/from the oxygen/air plenum 10. The electrolyte compartment 12 has an inlet 32 and outlet 34 for admitting and exhausting electrolyte flowing therethrough. Electrically conductive tabs terminal tabs 36 and 38 conduct current from the current collectors 18 and 24, respectively, to the outside of the housing 2 for connection to an electrical load or power supply, as appropriate, depending on whether the device is functioning as a voltaic current generator or as an electrolyzer.

Tests were conducted on a Type I hybrid cell/device constructed substantially according to the design depicted in FIGS. 1 and 2. The electrodes consisted of two layers: a backing layer which serves as a gas diffusion layer, and an active layer where the electrochemical reactions occur. The backing layer comprises Vulcan XC-72R carbon and 35–40% polytetrafluoro-ethylene (PTFE) binder prepared by applying a paste of the carbon/binder material onto a nickel screen and then sintering it in argon atmosphere at 350° C. for 90 min. A mixture of t-butanol and water in the ratio of 1:3 was used to make all the electrode pastes. The active layer comprised the fuel cell material on one half (16, 22) and the battery material on the other half (15, 20), as shown in FIG. 1, and was pressed onto the backing layer such that there was a slight overlap (i.e. ca. 2 mm–3 mm) 19, 23 between the fuel cell and the battery electrodes. Finally, a 0.2 mm thick Zirfon® film was pressed on to the active layers to prevent flooding of the electrode by the electrolyte, and for improved adhesion of the active material.

The fuel cell half-electrodes 16, 22 were prepared from carbon-supported platinum catalyst (i.e. Pt on Vulcan XC 72R carbon supplied by E-TEK) and 10–15% PTFE binder. Platinum loading in the catalyst layer was 0.2–0.3 mg/cm2. The MH battery half-electrode was prepared by mixing $LaNi_{4.7}Al_{0.3}$, in powder form (prepared by ball milling $LaNi_5$ and 2% wt Al), with 2–5% of Vulcan XC-72R carbon and 9% of polyethylene (PE) as binder. The nickel hydroxide battery half-electrode was prepared with $Ni(OH)_2$ active material, 20% Vulcan XC 72R carbon, 9% PE binder, and trace amounts of Zn or Co to minimize oxygen evolution. The hybrid/combination electrodes were hot pressed at 130° C. for 10 min. In addition, the electrodes were treated for 3 h in hot alkaline solution (7N of KOH at 95° C.) to promote access of electrolyte to the active material during cell operation. The electrodes were then glued (e.g. epoxy or ABS glue) onto frames made of ABS plastic. The current was collected along one edge of the current collector. The two combination/hybrid electrodes were assembled in a non-conductive cell/housing purchased from Astris Energi. The combination/hybrid electrodes were spaced from each other so as to provide an electrolyte compartment having an inter-electrode gap of about 1 cm through which 30% KOH electrolyte was circulated, from a 200 ml reservoir thereof. This large inter-electrode gap resulted in a cell resistance of 160 milliohms at 25° C. When an external electrical load is applied to the cell, both the AFC and the NiMH electrodes collectively contribute to the current generated by the cell.

Figure 3:
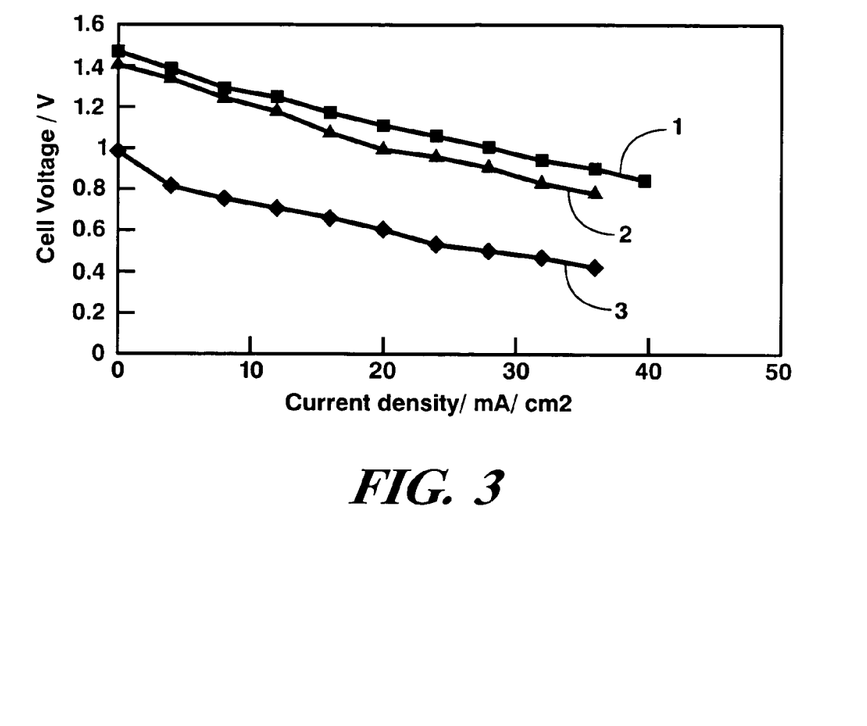
FIGS. 3–10 are graphs showing the results of tests conducted on the first embodiment shown in FIGS. 1 and 2.

Type I test cells were operated at ambient conditions (i.e. room temperature and atmospheric pressure) using hydrogen and $CO_2$-free air, and the voltage response of the cells was recorded as a function of time at various cell current densities. The current densities shown in all the figures are expressed in terms of the total/combined area of the battery and fuel cell electrodes, even when only the battery or fuel cell behavior is being evaluated. FIG. 3 shows the voltage at steady-state after 50 secs under various cell operating conditions. Curve 1 shows the performance of a cell in which the battery and fuel cell electrodes are both exposed to $H_2$ and $CO_2$-free air flowing through the respective plenums 8 and 10, and the battery electrodes were charged to 13 mAh capacity. Curve 2 shows the performance of a Type I cell in which the battery and fuel cell electrodes are both exposed to argon in the gas plenums such that only the NiMH battery is operative. Curve 3 shows the performance of a cell wherein the battery and fuel cell electrodes are both exposed to the $H_2$ and $CO_2$-free air, but the battery was fully discharged (i.e. only the AFC is operative). When both AFC and battery electrodes are sharing the same gases, electrolyte, and current collector, the current-voltage response is the highest (see FIG. 3, curve 1). In the presence of argon gas in both plenums, fuel cell reactions are not possible and the near-fully-charged battery electrode response alone is recorded (see FIG. 3, curve 2). The voltages in curve 1 are higher than those of curve 2, likely due to the interaction of the battery electrode with the gas diffusion electrodes to cause local charging of the battery electrode in the presence of fuel cell reactions at the gas diffusion electrodes. In the presence of argon, such local charging of the battery electrode does not occur, and hence the over-all cell response is lower. When the battery electrodes are completely discharged, no battery reactions are possible, and the AFC response alone is shown in FIG. 3, curve 3.

Figure 4:
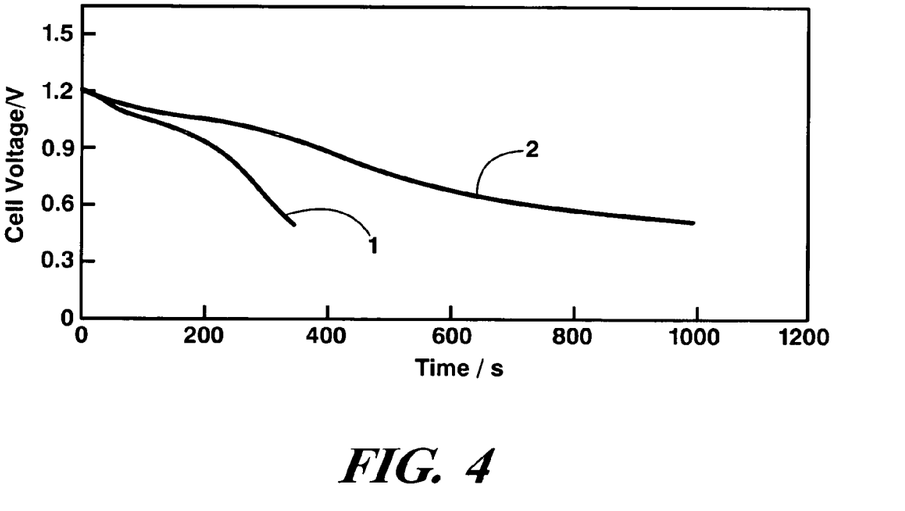

FIG. 4 shows the performance of a Type I cell in the high current density region as a function of time. In the presence of argon gas (see curve 1), the performance of the battery drops off much earlier than that observed in the presence of the fuel cell reactants (curve 2), indicating the importance of local cell charging in improving the performance of the cell.

Figure 5:
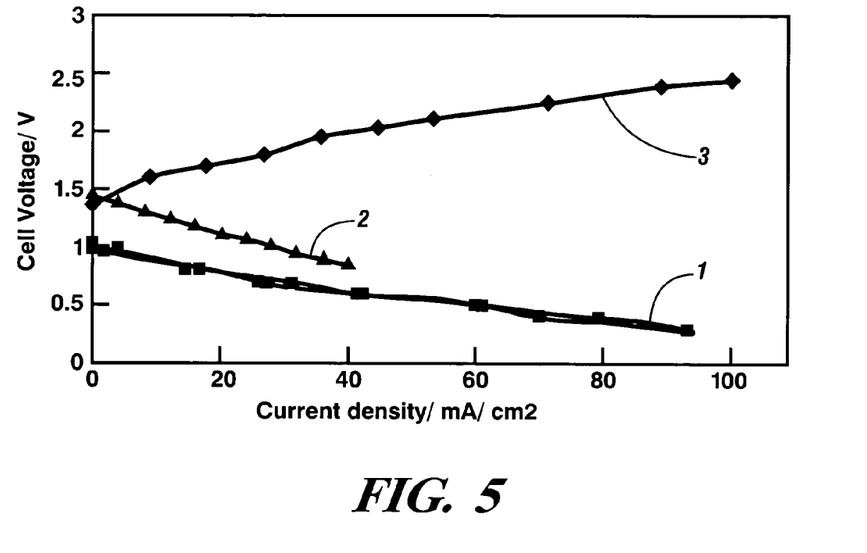

The hybrid cell/device of the present invention can also be operated as a water electrolyzer. FIG. 5 shows the current—voltage response of a Type I cell/device operating as a fully charged battery 9 (curve 2), as a fuel cell (curve 1), or as a water electrolyzer with fully charged battery electrodes (curve 3). The electrolyzer operation demonstrated that this cell can be operated reversibly without any deterioration in the fuel cell performance.

Figure 6:
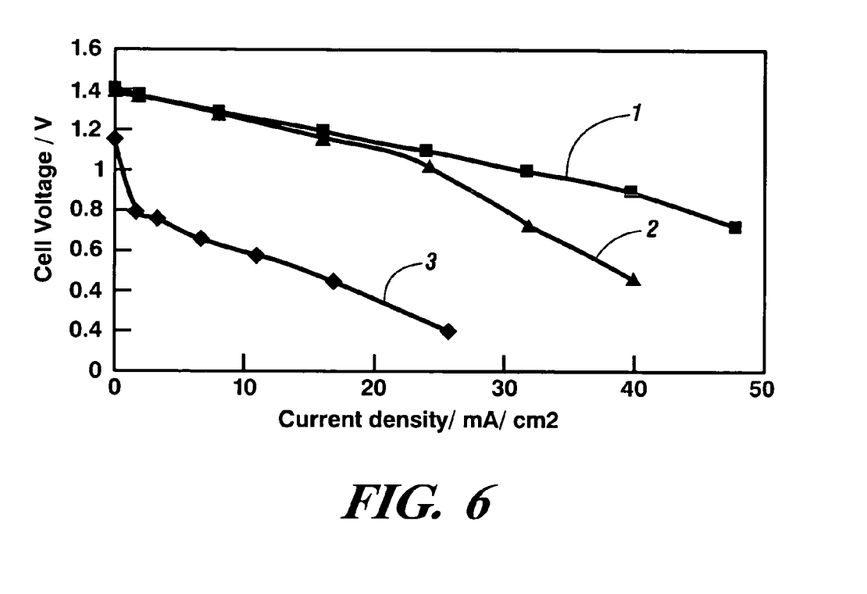

Instead of maintaining an inert atmosphere in the gas plenums, the effect of shutting off the vents to the gas plenum was investigated and the results shown in FIG. 6. In this test, the battery electrodes were charged to 12 mAh, the electrolyte was 30% KOH, the temperature was 25° C., and the pressure was one atmosphere. Though the same performance trend is observed, the hybrid cell performance with fuel cell gases present (curve 1) was much higher than the battery alone (curve 2) or AFC alone (curve 3). When the gas inlets are shut, in addition to the lack of local charging of the battery electrode, the fuel cell reactants may be present in trace amounts to cause reactions that lead to large polarization losses at the gas diffusion electrodes.

Figure 7:
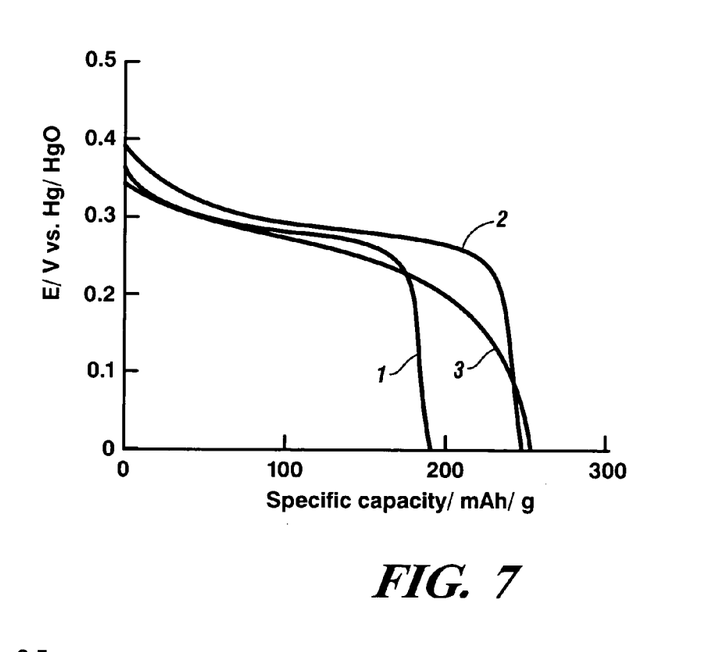
Figure 8:
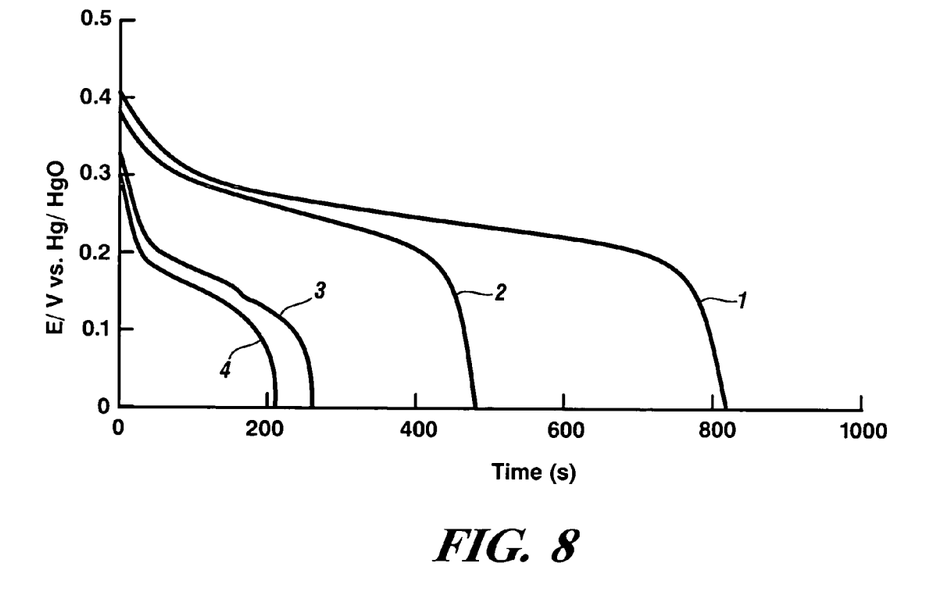

To determine if the fuel cell reactions also occur on battery electrode sites, tests were performed with single battery electrodes and single hybrid/combination electrodes. A three-electrode experiment was carried out with the battery or the hybrid/combination electrode as the working electrode, a platinum counter electrode and a Hg/HgO reference electrode. FIG. 7 shows the discharge response of a NiOOH electrode [i.e. 64% $Ni(OH)_2$, 22% Vulcan XC-72R carbon, 13% PTFE] when the charging was done (a) in argon atmosphere (curve 1), (b) in the presence of air at atmospheric pressure (curve 2), and (c) in the presence of air at 10 psig pressures (curve 3). The air flow rate was 300 ml/min. The discharge current density was 8.3 mA/cm2. The temperature was 26° C. and the pressure 1 atm. The amount of charge passed during charging was the same for all tests (i.e. 288 mAh/g). It is seen from FIG. 7 that though the presence of air enhances the discharge capacity by nearly 20%, the capacity is still less than the amount of charge passed during charging. However, some direct interaction of oxygen with the battery electrode material enhances the efficiency of charging. The NiOOH electrode was also exposed to air for 10 hours to see if any open-circuit charging of the electrode occurs. No charging of the electrode was observed showing that the oxygen reduction reaction at the open-circuit potential is negligible. The results of a similar experiment with a nickel/platinized carbon hybrid electrode are shown in FIG. 8 where: curve 1 shows the results of discharging the electrode at 7 mA/cm2 in the presence of air (i.e. C=4.5 mAh); curve 2 shows the results of discharging at 7 mA/cm2 in the presence of argon (i.e. C=3.3 mAh); curve 3 shows the results of discharging at 20 mA/cm2 in the presence of air (i.e. C=4.0 mAh); and curve 4 shows the results of discharging at 20 mA/cm2 in the presence of argon (i.e. C=2.6 mAh). These results indicate that the presence of air improves the discharge capacity, especially at low discharge rates.

Figure 9:
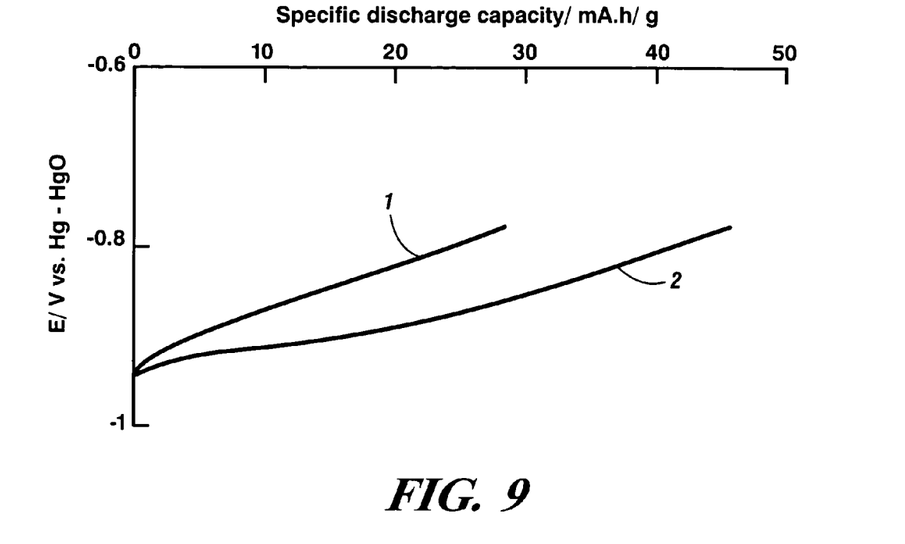

In the case of the hydride electrode in the presence of hydrogen (100 ml/min flow), the electrode was not charged electrochemically, but was just exposed to hydrogen for 5 h and 15 h. It was then discharged at a rate of 4 mA/cm2, a temperature of 25° C. and 1 atm. pressure. The discharge response is shown in FIG. 9 where curve 1 is the 5 hr $H_2$ exposure curve, and curve 2 is the 15 hr. $H_2$ exposure curve. FIG. 9 shows that the discharge capacities increase with duration of exposure, and hence that the hydride electrode is indeed being charged at open-circuit, albeit at a slow rate.

Figure 10:
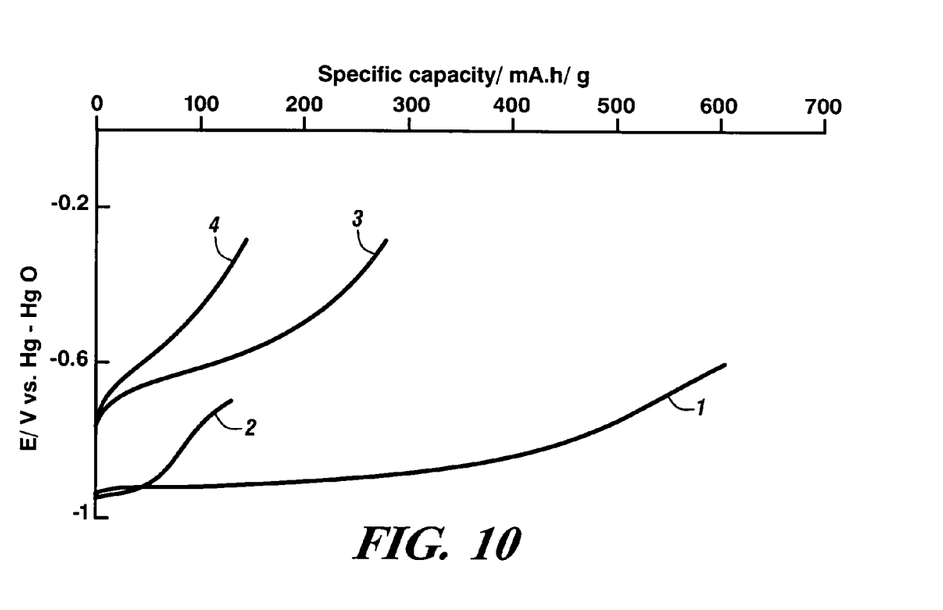

FIG. 10 shows the discharge response of the hybrid MH/AFC electrode in the presence/absence of hydrogen at 25° C., and 1 atm. pressure. Curve 1 shows the capacity of the electrode when discharged at 7 mA/cm2 in the presence of hydrogen. Curve 2 shows the capacity of the electrode when discharged at 7 mA/cm2 in the presence of argon. Curve 3 shows the capacity of the electrode when discharged at 40 mA/cm2 in the presence of hydrogen. Curve 4 shows the capacity of the electrode when discharged at 40 mA/cm2 in the presence of argon. These results show a remarkable influence of the presence of hydrogen on the discharge capacity, indicating that hydrogen oxidation at the fuel cell electrode aids the charging of the battery electrode. The data shows that the discharge capacity of the battery electrodes is benefited by the presence of fuel cell catalysts likely due to in-situ charging of the electrodes.

Figure 11:
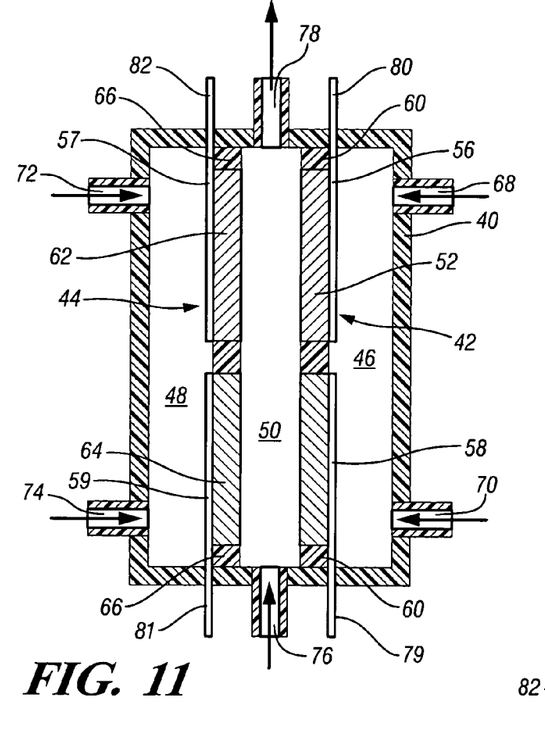
FIG. 11 is a schematic, side-view illustration of a second embodiment of a hybrid electrochemical device according to the present invention.
Figure 12:
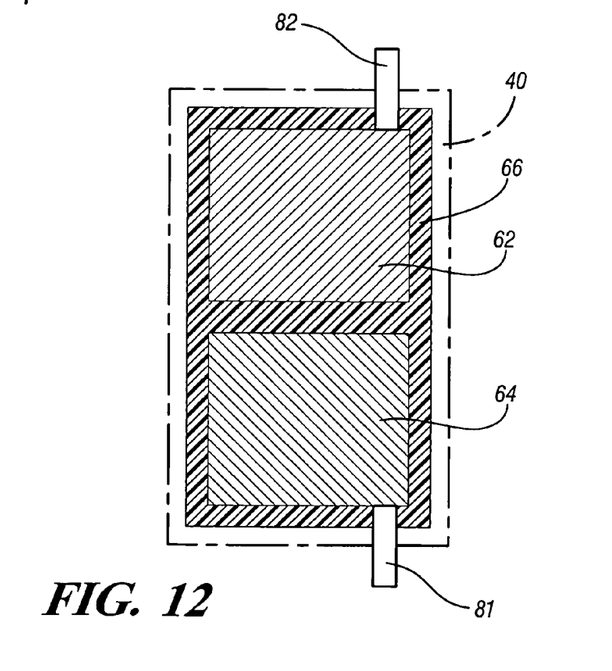
FIG. 12 is a view of a combination electrode of the present invention taken in the direction 12—12 of FIG. 11.

FIGS. 11 and 12 schematically depict a second embodiment (hereafter Type II cell) of the subject invention wherein the battery and fuel cell electrodes share a common electrolyte, and common reactant gases, but not common current collectors. More specifically, the device comprises a housing 40 (shown in phantom in FIG. 12) encasing a first hybrid/combination electrode 42 and a second hybrid/combination electrode 44, which electrodes divide the housing 40 into a hydrogen plenum 46 behind the first combination electrode 42, an $O_2$/air plenum 48 behind the second combination electrode 44, and an electrolyte compartment 50 between the first and second combination electrodes 42 and 44. The first combination electrode 42 comprises a MH battery electrode portion 52 and a hydrogen gas-diffusion fuel cell electrode portion 54, each bonded to separate current collectors 56 and 58 which are mounted to a nonconductive frame 60 (e.g. acrylonitrile butadiene styrene or epoxy). In this Type II embodiment, the battery portion 52 and the fuel cell portion 54 are electronically isolated from each other (i.e. they do not share a common current collector). The second combination electrode 44 comprises a NiOOH battery electrode portion 62 and an oxygen (e.g. air) gas-diffusion fuel cell electrode portion 64, each bonded to a separate current collector 57 and 59 and mounted in a frame 66. The battery portion 62 and the fuel cell portion 64 are electronically isolated from each other (i.e. they do not share a common current collector). The hydrogen plenum 46 has a hydrogen inlet 68, and a hydrogen outlet 70 for admitting and exhausting hydrogen to/from the hydrogen plenum 46. The air plenum 48 has an air inlet 72, and an air outlet 74 for admitting and exhausting air to/from the air plenum 48. The electrolyte compartment 50 has an inlet 76 and outlet 78 for admitting and exhausting electrolyte flowing therethrough. Conductive terminal tabs 79, 80, 81 and 82 conduct current from the current collectors and direct it to the outside of the housing 40 for connection to an electrical load or power supply, as appropriate, depending on whether the device is functioning as a current generator or as an electrolyzer. This second embodiment differs from the first embodiment in that the battery electrodes 52, 62 are electronically isolated from the fuel cell electrodes 54, 64, and the battery and fuel cell electrodes each have their own electrical terminals tabs 79, 80, 81, 82 communicating with the outside of the cell.

Figure 13:
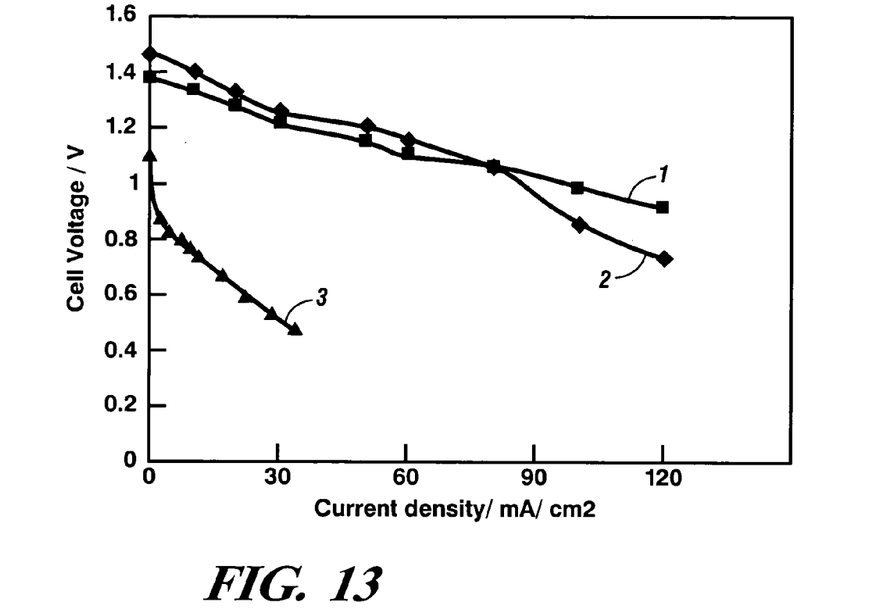
FIG. 13 is a graph showing the results of some tests conducted on the second embodiment shown in FIGS. 11 and 12.

Tests were conducted on a Type II cell made substantially according to FIGS. 11 and 12. The electrodes were prepared using the same procedure described above for the first embodiment cell except that the battery and fuel cell electrodes were electronically separated from each other internally (i.e., did not share a common current collector). With this design, the fuel cell and the battery can be connected externally either in parallel or in series modes by connecting the terminal tabs 79, 80, 81, 82 appropriately. The battery anode comprised 90% $LaNi_{4.7}Al_{0.3}$, 6% PE and 4% Vulcan XC-72R carbon. The battery cathode comprised 61% $Ni(OH)_2$, 12% PE, 21% Vulcan carbon and 6% Co. The gas diffusion fuel cell electrodes both contained 0.3 mg/cm2 Pt. The tests were conducted with circulating 30% KOH electrolyte at 25° C. and 1 atm. pressure. Otherwise, the battery and fuel cell electrodes share the reactant gases and the electrolyte similar to the Type I embodiment. The battery was charged to a capacity of 16 mAh. The discharge current-voltage performance of the Type II cell is shown in FIG. 13 wherein curve 1 is the combined battery and fuel cell, curve 2 is the battery alone, and curve 3 is the fuel cell alone. The data indicates that, at any given current density, the Type II cell embodiment outperforms the Type I cell embodiment, and suggests that internal electronic isolation of the battery and fuel cell electrodes has a beneficial effect on cell performance. This may be attributed to electrolysis reactions in the gas diffusion electrodes, especially during the charging of the battery electrode, which may reduce the current efficiency and the ability to fully charge the battery electrode in the Type I cell embodiment, as is evident from the performance of the hydride hybrid electrode in FIG. 10. At low current densities and open-circuit, the battery shows higher voltages than the hybrid cell, likely due to the mixed potentials that are set up at the hybrid electrode. At higher current densities, the performance of the hybrid cell is higher than that of the battery, indicating a role of local electrochemical charging at the battery electrode in the presence of hydrogen/air.

Figure 14:
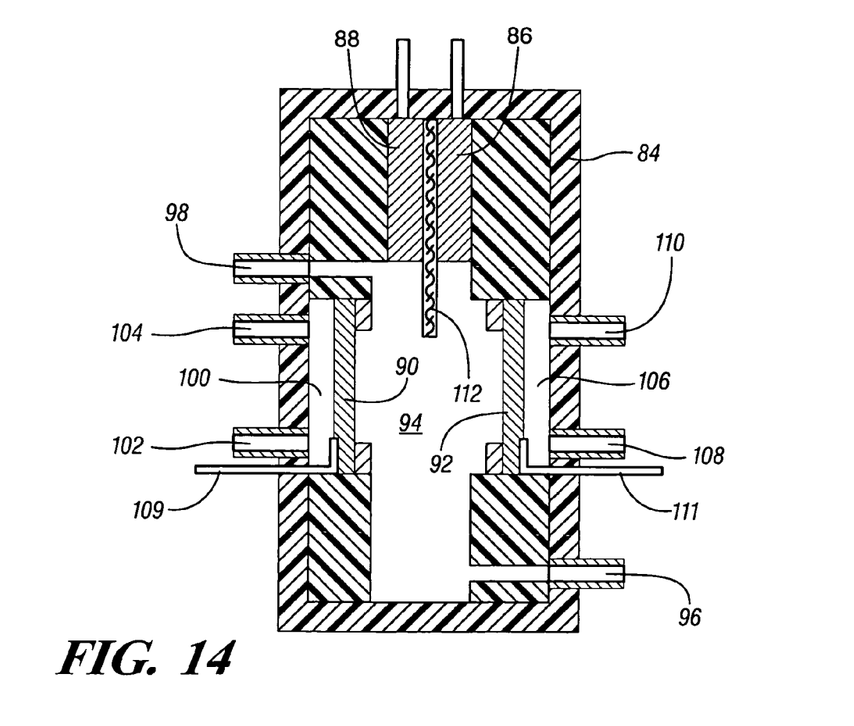
FIG. 14 is a schematic, side-view illustration of a third embodiment of a hybrid electrochemical device according to the present invention.

FIG. 14 schematically depicts a third embodiment (i.e. Tupe III) of the invention wherein the battery electrodes are internally electronically isolated from the fuel cell electrodes and are not exposed to the reactant gases. The electrodes are assembled in such a way that the electrolyte circulates between the fuel cell's gas-diffusion electrodes, but not between the battery electrodes. Rather, the battery electrodes use a KOH— soaked porous separator (e.g. Zirfon® membrane) as the electrolyte, which separator is in physical contact with the electrolyte circulating between the fuel cell electrodes. More specifically, the device comprises a housing 84 encasing a NiOOH electrode 86 a MH electrode 88, a hydrogen-diffusion electrode 90, and an oxygen/air-diffusion electrode 92. The fuel cell electrodes 90, 92 are separated from each other by an electrolyte compartment 94 through which KOH electrolyte flows between an inlet 96 and outlet 98. The battery electrodes are separated from each other by a KOH-soaked porous separator (e.g. Zirfon®) 112 that extends passed the battery electrodes and into the electrolyte compartment 94 and provides an electrolyte bridge between the battery and fuel cell electrodes. A hydrogen plenum 100 is provided behind the hydrogen-diffusion electrode 90 and has an inlet 102 and outlet 104 for receiving and exhausting hydrogen to/from the plenum 100. Similarly, an air plenum 106 is provided behind the air gas diffusion electrode 92, and has an inlet 108 and outlet 110 for respectively receiving and exhausting air to/from the plenum. Hence, the battery portions (i.e. electrodes 86 & 88) and the fuel cell portion (i.e. electrodes 90 & 92) are internally electronically isolated from each other (i.e. they do not share a common current collector). Neither do they share the hydrogen or air plenums 100, 106. Terminal tabs 109 and 111 conduct current from inside the housing 84 to the outside thereof.

Figure 15:
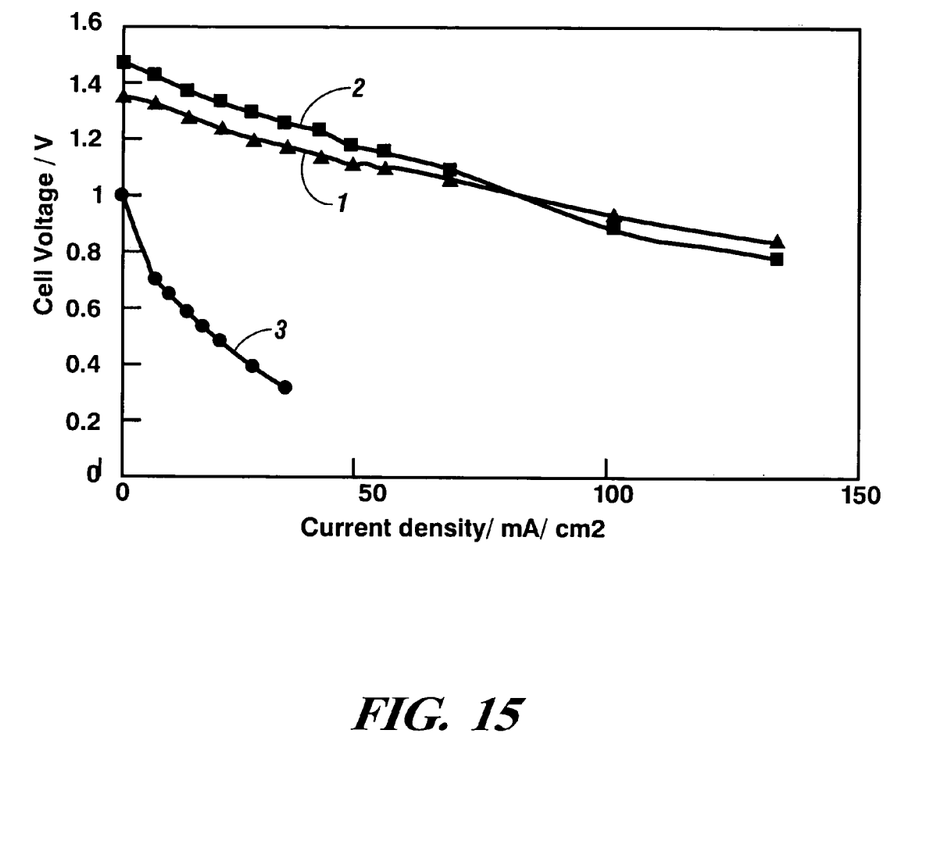
FIG. 15 is a graph showing the results of some tests conducted on the third embodiment shown in FIG. 14.

Tests were conducted on the Type III cell embodiment at 26° C. and 1 atm. pressure. The cells had electrodes with the same composition as the Type II cell embodiment, but were charged to a capacity of 17 mAh. Current-voltage performance of the Type III cell embodiment is shown in FIG. 15 where curve 1 is the results of combining battery and fuel cell together connected in parallel, curve 2 is the battery alone, and curve 3 is the fuel cell alone. When the battery and fuel cell are connected in parallel (see curve 1), the combined voltage drops below that of the battery electrodes at lower current densities, as is to be expected from cells that differ in their equilibrium cell voltages. At higher current densities, the performance of the third embodiment drops by about 50 mV compared to that of the Type II cell embodiment (see FIG. 13) under substantially the same conditions. This is likely due to lack of exposure of the battery electrodes to the fuel cell reactants.

Figure 16:
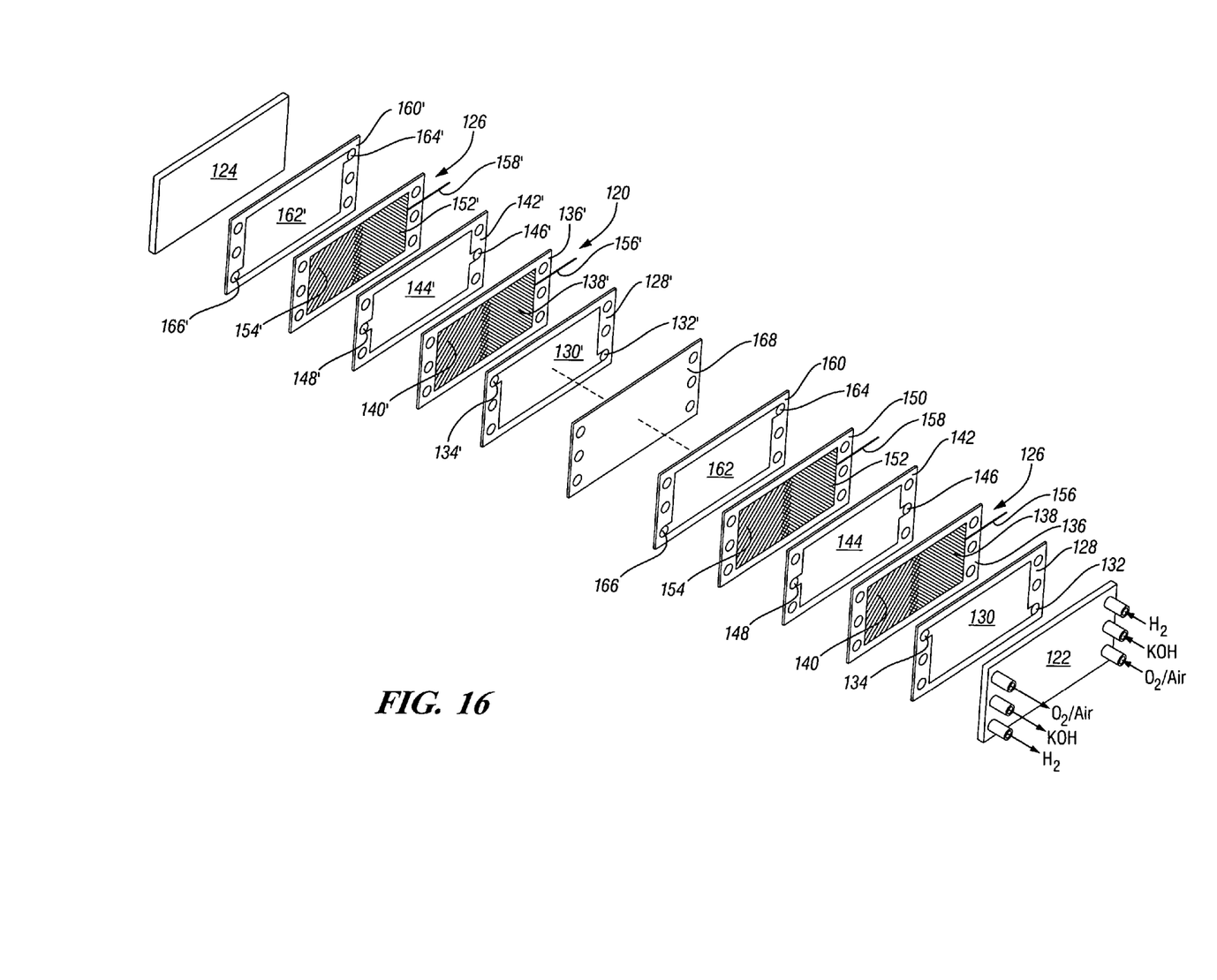
FIG. 16 is an exploded, isometric schematic illustration of a multi-cell stack of first-embodiment-type hybrid electrochemical devices according to the present invention.

FIG. 16 depicts/illustrates how a multi-cell stack 120 of Type I cells would look (only two end cells shown). The stack 120 comprises a cathode terminal-plate 122, anode terminal-plate 124 and a plurality of cells 126 therebetween (only the two end cells shown). Many others would be positioned between the end cells to form a large multi-cell stack. A first non-conductive (e.g. plastic) gasket 128 defines an oxidant plenum 130 through which air/$O_2$ flows from an inlet 132 to an outlet 134. A first non-conductive frame 136 carries the combined NiOOH electrode 138 and $O_2$/air gas-diffusion electrode 140. A second non-conductive gasket 142 defines an electrolyte compartment 144 through which electrolyte flows from an inlet 146 to an outlet 148. A second non-conductive frame 150 carries the combined MH electrode 152 and H2-diffusion electrode 154. A third non-conductive gasket 160 defines a hydrogen plenum 162 through which hydrogen flows from an inlet 164 to an outlet 166. Impervious non-conductive partitions 168 separate one cell from the next in the stack. Conductive tabs 156 and 158 connect the combined electrodes of each cell with similar tabs from the other cells as desired (i.e. in series or parallel) by the stack designer. In all of the embodiments, the several holes in the gaskets and frames are aligned to provide inlet and exhaust manifolds for the hydrogen, oxygen and electrolyte, as is well known in the art.

Figure 17:
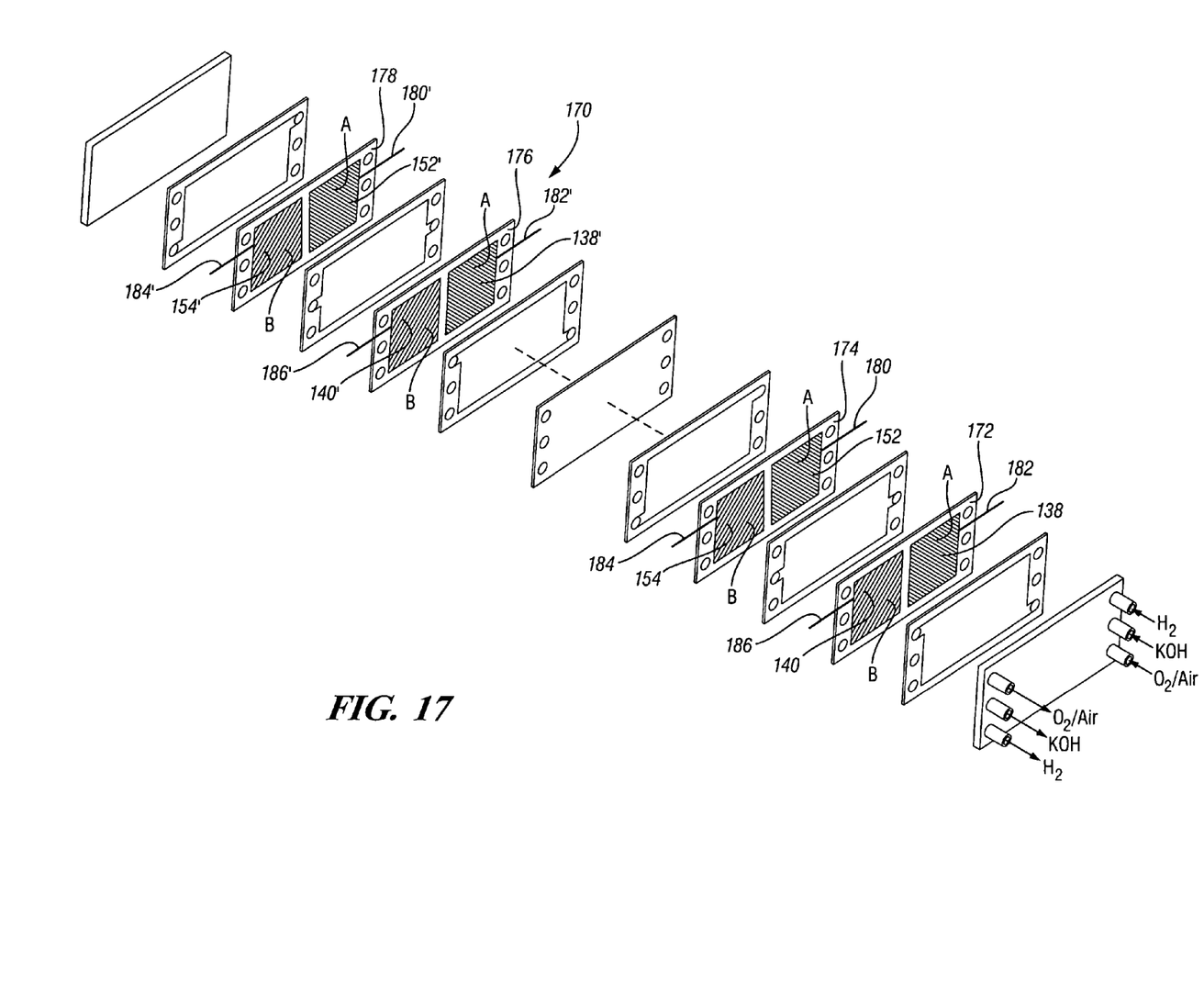
FIG. 17 is an exploded, isometric schematic illustration of a multi-cell stack of second-embodiment-type hybrid electrochemical devices according to the present invention.

FIG. 17 depicts/illustrates how a multi-cell stack 170 of Type II cells would look (only the two end cells shown). Many others would be positioned between the end cells to form a large multi-cell stack. The stack 170 is, for the most part, essentially the same as described above in FIG. 16 except that the frames 172, 174, 176 and 178 each have two windows A and B for mounting the several electrodes so that they are electrically independent from each other. That is to say, so that the NiOOH electrode 138 is not electrically connected (e.g. as by a common current collector) to the O$_2$/air gas-diffusion electrode 140, and the MH electrode 152 is not electrically connected to the H2 gas-diffusion electrode 154. In this embodiment, each electrode has its own independent current collecting tab 180, 182, 184, 186 for conducting current to outside the cells.

While the invention has been described and illustrated in terms of certain specific embodiments thereof, it is not intended to be limited thereto, but rather only to the extent set forth hereafter in the claims which follow. For example, while FIGS. 16 and 17 depict stacks in which the several cells are aligned horizontally, vertically cells are seen to be just as effective and are within the scope of the present invention.

The invention claimed is:

1. An integrated hybrid electrochemical device comprising, (1) housing, (2) a first set of electrodes in said housing which, in the charged state, comprises a NiOOH electrode, and a dissociable metal-hydride electrode, (3) a second set of electrodes within said housing comprising a hydrogen gas-diffusion electrode and an oxygen/air gas-diffusion electrode, (4) an alkali metal hydroxide electrolyte common to all of said electrodes, (5) an oxygen/air plenum confronting said oxygen/air gas-diffusion electrode for supplying air to said air oxygen/gas-diffusion electrode, and (6) a hydrogen plenum confronting said hydrogen gas-diffusion electrode for supplying hydrogen to said hydrogen gas-diffusion electrode.

2. A hybrid electrochemical device according to claim 1 wherein said oxygen/air plenum also confronts said nickel hydroxide electrode and supplies oxygen/air to said nickel hydroxide electrode, and said hydrogen plenum also confronts said metal-hydride electrode and supplies hydrogen to said metal hydride electrode.

3. A hybrid electrochemical device according to claim 1 wherein said metal-hydride is a hydride of a transition metal.

4. A hybrid electrochemical device according to claim 1 further comprising an electrolyte absorbent separator interjacent said NiOOH and metal-hydride electrodes and wetted by said electrolyte.

5. A hybrid electrochemical device according to claim 4 comprising an electrolyte compartment remote from said first set of electrodes and containing said electrolyte between said gas-diffusion electrodes, said separator communicating with said chamber.

6. An integrated hybrid electrochemical device comprising, (1) housing, (2) a first set of electrodes within said housing which, in the charged state, comprises a NiOOH electrode and an electrochemically dissociable metal-hydride electrode, (3) a second set of electrodes within said housing comprising a hydrogen gas-diffusion electrode and an oxygen/air gas-diffusion electrode, (4) an alkali metal hydroxide electrolyte common to all of said electrodes, (5) an oxygen/air plenum confronting said air gas-diffusion electrode and said NiOOH electrode for supplying oxygen/air to said oxygen/air gas-diffusion and NiOOH electrodes, (6) a hydrogen plenum confronting said hydrogen gas-diffusion electrode and said metal hydride electrode for supplying hydrogen to said hydrogen gas-diffusion and metal hydride electrodes, (7) a first current collector common to both said oxygen/air gas-diffusion and said NiOOH electrodes for collectively conducting electrical current from said oxygen/air-diffusion and said NiOOH electrodes upon discharge of said device, and (8) a second current collector common to both said hydrogen gas-diffusion and said metal-hydride electrodes for collectively conducting electrical current from said hydrogen-diffusion and said metal-hydride electrodes upon discharge of said device.

7. A hybrid electrochemical device according to claim 6 wherein said NiOOH electrode contacts said oxygen/air-diffusion electrode on said current collector.

8. An integrated hybrid electrochemical device comprising, (1) a housing (2) a first set of electrodes within said housing which, in the charged state, comprises a NiOOH electrode, and an electrochemically dissociable metal-hydride electrode, (3) a second set of electrodes within said housing comprising a hydrogen gas-diffusion electrode and an oxygen/air gas-diffusion electrode, (4) an alkali metal hydroxide electrolyte common to all of said electrodes, (5) an oxygen/air plenum confronting said oxygen/air gas-diffusion electrode and said NiOOH electrode for supplying oxygen/air to said oxygen/air gas-diffusion and NiOOH electrodes, (6) a hydrogen plenum confronting said hydrogen gas-diffusion electrode and said metal hydride electrode for supplying hydrogen to said hydrogen gas-diffusion and metal hydride electrodes, and (7) separate current collectors for each of said electrodes whereby electrical current can be conducted from each of said sets independently of the other of said sets.

9. An integrated hybrid electrochemical device comprising, (1) a housing, (2) a first set of electrodes within said housing which, in the charged state, comprises a NiOOH electrode, and a dissociable metal-hydride electrode, (3) a second set of electrodes within said housing comprising a hydrogen gas-diffusion electrode and an oxygen/air gas-diffusion electrode, (4) an electrolyte chamber between said second set of electrodes for containing an alkali metal hydroxide electrolyte common to all of said electrodes, (5) an oxygen/air plenum confronting said oxygen/air gas-diffusion electrode for supplying oxygen/air to said oxygen/air gas-diffusion electrode, (6) a hydrogen plenum confronting said hydrogen gas-diffusion electrode for supplying hydrogen to said hydrogen gas-diffusion electrode, and (7) a porous, electrolyte-wetted material separating said first set of electrodes one from the other and communicating with said electrolyte in said chamber, said first set of electrodes being isolated from said plenums so as not to be exposed to hydrogen or air from said plenums.

10. A hybrid electrochemical device according to claim 9 wherein said gas diffusion electrodes are covered by said material.

11. A hybrid electrochemical device according to claim 1 wherein said gas diffusion electrodes comprises an H2-storing catalyst, and said oxygen/air gas diffusion electrode comprises an O2-storing catalyst.

* * * * *